(No Model.)
C. K. HARDING.
PROCESS OF SMELTING PHOSPHORUS.
No. 602,747. Patented Apr. 19, 1898.
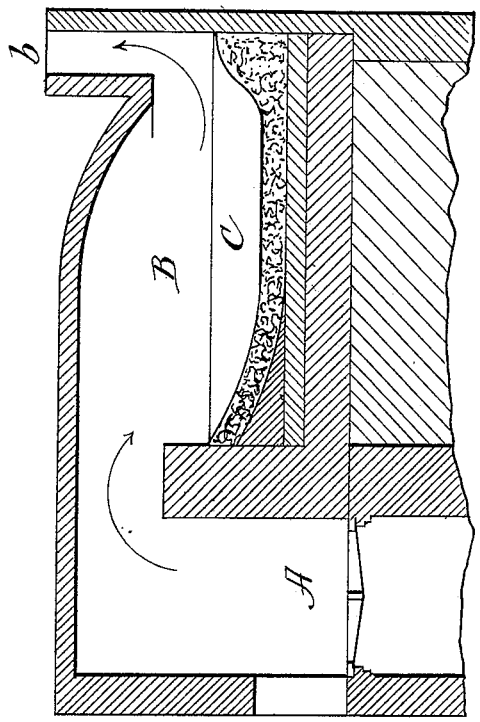
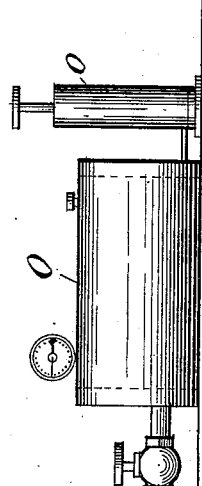
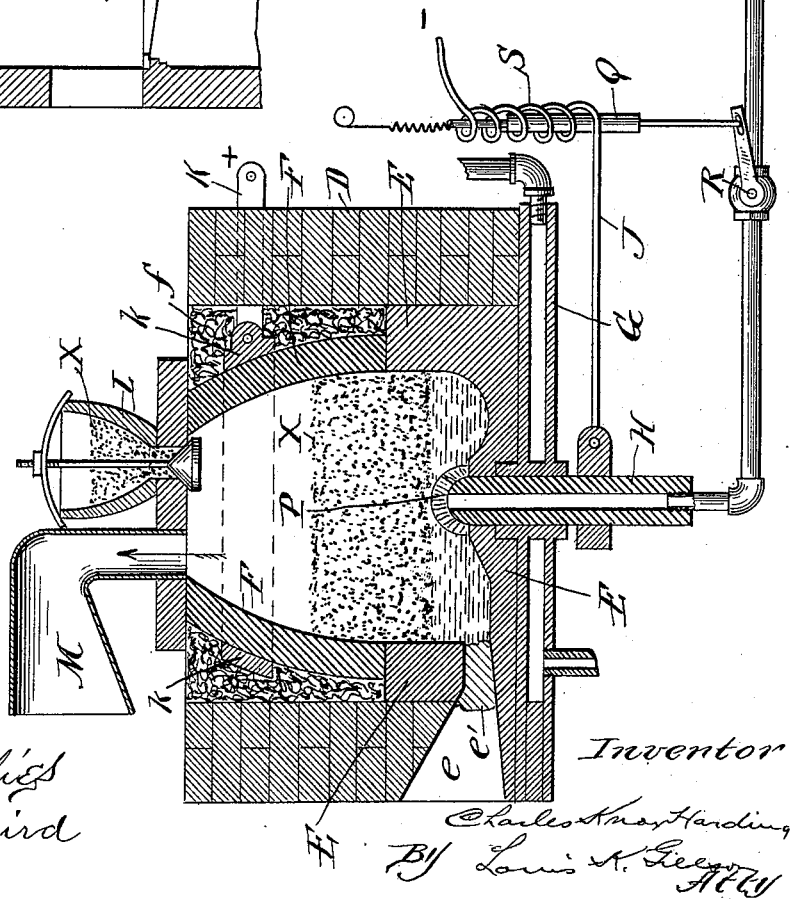
Witnesses
W. C. Caligs
H. B. Baird
Inventor
Charles Knox Harding
By Louis K. Gilson
Atty

UNITED STATES PATENT OFFICE.

CHARLES KNOX HARDING, OF CHICAGO, ILLINOIS.

PROCESS OF SMELTING PHOSPHORUS.

SPECIFICATION forming part of Letters Patent No. 602,747, dated April 19, 1898.

Application filed April 5, 1897. Serial No. 630,826. (No specimens.)

*To all whom it may concern:*

Be it known that I, CHARLES KNOX HARDING, a citizen of the United States, residing at Chicago, in the county of Cook and State of Illinois, have invented certain new and useful Improvements in Processes of Smelting Phosphorus; and I do declare the following to be a full, clear, and exact description of the invention, such as will enable others skilled in the art to which it appertains to make and use the same, reference being had to the accompanying drawings, and to the letters of reference marked thereon, which form a part of this specification.

In the manufacture of phosphorus from phosphate rock containing tricalcic phosphate and having the symbol $3(CaO)P_2O_5$ and in which the proportion of lime and phosphoric oxid are as one hundred and sixty to one hundred and forty-two it has heretofore been found necessary to retain, because of its low specific heat, a considerable percentage of the lime to facilitate the heating of the mass to the exceedingly high temperature essential to the smelting operation without destroying the furnace and to prevent the fusing of the material and the consequent separation by gravity of the reducing agent from the phosphatic material, and in the most successful methods, as I am informed, the crucible will usually endure only one and rarely more than two heats.

The only known acid material of which crucibles may be made which will endure the smelting heat of phosphorus is silica, with which, because of its acid reaction, the lime will combine. By the use of the electric furnace, forming the subject of another application for patent, I am able to concentrate upon the material a heat sufficient to perform the smelting operation without relying upon the lime as an accessory to this end and to introduce the reducing agent into the molten mass, and I have therefore been able to employ the continuous process of smelting phosphorus from phosphate rock or similar substances, which forms the subject of this application. A further advantage of my process is in that it provides for the elimination, in advance of the smelting operation, of basic materials which would otherwise form slag, or which would result in the formation, at the high temperature of the arc, of sulfids, phosphides, and carbids. Thereby great economy is secured in that it becomes unnecessary to expend heat energy upon useless and deleterious substances, and substantially all of the phosphorus is smelted out.

My process consists in first eliminating from the material to be smelted all of the lime or as much of it as can possibly be eliminated, employing for this purpose the methods heretofore practiced, such as the treating of the rock with sulfuric acid. This is done by finely pulverizing the rock, mixing it with an excess of the acid over the quantity theoretically required to convert all of the basic material into sulfates, the strength of the acid being 20° Baumé, boiling the mixture with continuous agitation for several hours, then filtering out the sulfate of lime. The liquid is now boiled down to a syrup. The phosphoric oxid $(P_2O_5)$ remaining, which will contain other substances not desired, such as sulfur compounds, I place in a reverberatory furnace, intermixing therewith a quantity of carbon, and subject it to high temperature for several hours, supplying to the furnace an excess of oxygen beyond the requirements for the combustion of the furnace. As soon as the material has become dehydrated by the action of the heat the sulfur compounds are smelted and oxidation commences, the roasting operation being continued until I have eliminated all of the sulfur. The roasting operation may be, if desired, and is, preferably, continued, more carbon being introduced, and two parts of the oxygen are smelted out. The carbon introduced may be in any form. I prefer it granulated, and the material by stirring is all brought to granular form during the treatment in the reverberatory furnace. I now treat the material thus freed from the bases and sulfur, whether it be phosphoric oxid $(P_2O_5)$ or phosphorous oxid, $(P_2O_3,)$ or a mixture of the two, in the electric furnace, in which I employ a crucible lined with carbon slabs, except that the bottom, the floor, and lower portions of the wall are of silica, and having a tubular carbon electrode, of relatively small area as compared with the carbon walls, entering through the non-conducting material. The tubular carbon is connected with the negative pole of a suitable dynamo and the carbon lining of the crucible with its positive pole. A service-pipe leads to the bore of the cathode from a supply of hydrocarbon under suitable pressure. The material is introduced into the crucible while still hot and in sufficient quantity to not only submerge the cathode but to extend well upon the carbon lining. Being hot the carbon in the material forms a comparatively good conductor and constitutes a part of the electric circuit, though, owing to the slight contact of its particles, its resistance is sufficient to develop considerable heat and prevent the mass from cooling to any extent. As the operation is continued the phosphorous oxid melts and there is a tendency to a separation therefrom of the granular carbon by reason of the difference between their specific gravities, and hence the smelting operation is confined to the upper portion of the fused mass unless means be provided for introducing an additional supply of carbon from below. I seek to accomplish the introduction of this additional supply of carbon from below and at the same time to establish an atmosphere or zone of vapor across which to develop an arc by delivering into the charge through a tubular negative electrode submerged therein, and preferably entering the crucible through its bottom, a continuous supply of hydrocarbon. My theory about the resultant action, a theory which I have demonstrated in practice to my entire satisfaction, is that the hydrocarbon is separated into its elements as it is discharged from the cathode and that the hydrogen is electrolytically held, so as to form a film over the end of the cathode, crowding back the charge therefrom, the carbon uniting with the oxygen of the charge, thereby performing the smelting operation.

The phosphorous oxid is apt to contain impurities, such as iron or alumina, and when fused the mass forms a slag, retaining the phosphorus. It is impossible to mechanically intermix the carbon with this molten material for the purpose of smelting out the phosphorus because of the greater weight of the metal. By introducing the reducing agent through the submerged cathode, allowing it to bubble up through the material, I am able to smelt out the phosphorus from this slag.

The phosphorus is liberated in gaseous form and is maintained at a temperature above that at which it recombines with oxygen as it passes through the heated mass.

A commodious outlet for the vapors is provided, and as they emerge from the mass they expand to great volume very suddenly and with a consequent enormous drop in temperature, the transition from a temperature above that of recombination of phosphorus and oxygen to that at which they do not readily combine being almost instantaneous, so that upon delivery to a condenser the phosphorus becomes liquid and may be drained into a suitable receptacle.

It is essential to the carrying on of a continuous smelting operation either that all of the sulfur be eliminated from the phosphatic material before it enters the electric furnace or that means be provided for forming with the sulfur some compound which will not have a deleterious action upon the phosphorus as it is set free by the smelting operation. Otherwise the sulfur will combine with the carbon, forming carbon disulfid, which is a powerful solvent of phosphorus, and if present, even in small quantities, will practically defeat the object sought to be attained. By eliminating the sulfur, so far as practicable, and providing means for rendering innocuous so much of it as remains in the material when submitted to the final smelting-furnace I am able to make the smelting operation continuous instead of, as heretofore in practice, making it intermittent and smelting out phosphorus as the last step in a succession of operations, all of the preceding steps having been necessary to eliminate impurities. Nearly all of the sulfur is eliminated in the reverberatory furnace. The introduction of hydrogen into the electric furnace takes care of the sulfur which may remain in the material, and combining with the hydrogen more readily than with the carbon and forming sulfureted hydrogen, which passes off without affecting the phosphorus.

In the accompanying drawings I show, in Figure 1, a diagrammatic view of the reverberatory furnace employed; Fig. 2, a similar view of the electric furnace.

The reverberatory furnace is of ordinary form having a fire-box A, a reverberatory chamber B, an exit-flue $b$, and a pan C, within which the material to be acted upon is placed.

The electric furnace shown comprises the inclosing walls D, of masonry, the bottom E, of suitable material, such as silica, which may be built in plastic form, as shown, or as may be desired, and which extends as a lining upwardly for a short distance, and a carbon lining F, forming the upper portion of the walls of the crucible. Any suitable packing of non-conducting material may be introduced at $f$ between the carbon walls F and the outer walls D. The furnace rests upon a hollow metal base G, through which water may be circulated for the purpose of reducing the temperature of the bottom of the furnace.

The negative electrode H is tubular and enters the crucible through the bottom of the furnace, the silica lining being built up around it, so as to form an annular trough for the slag, which may be drawn off through the tap-hole $e$, which is shown as being closed by a suitable luting $e'$. The negative wire J of an electric circuit leads to the electrode H, and the positive branch K of the circuit is electrically connected with the carbon walls F by means of a metallic band $k$.

The material X is fed to the crucible through a suitable hopper, as L, and the gases developed by the smelting operation are led from the crucible by means of a discharge-pipe M.

Hydrocarbon, preferably in the form of gasolene, is supplied to the crucible through the electrode H from a suitable tank, as O, to which pressure may be applied by means of a pump, as $o$. The hydrocarbon is electrolyzed at the end of the electrode H and forms a zone of hydrogen gas thereabout, as indicated at P, across which the arc is developed. The arc is regulated by controlling the supply of hydrocarbon, and this is accomplished by means of a valve R, actuated by a solenoid comprising a core Q and a coil S, which is a part of the electric circuit, as shown, being in series with the arc. Should there be an excessive supply of hydrocarbon, and consequently a thickening of the hydrogen zone about the cathode, the current is decreased in quantity by the increased resistance and the core of the solenoid falls and closes the valve R, with which it is connected. There is, of course, a constant dissipation of the hydrogen, and upon a slight decrease in the supply of hydrocarbon the hydrogen zone becomes at once reduced in thickness, thereby lessening the resistance and increasing the quantity of current, and consequently the magnetic pull upon the core of the solenoid and the opening of the valve R.

The form of the electric furnace may be varied, it being important only that its essential features are retained, which may be enumerated as the tubular cathode, located so as to be normally covered by the mass of material to be operated upon, the carbon slabs, forming a part of the lining of the crucible, the supply of hydrocarbon, and the regulating mechanism whereby the arc is governed by automatically controlling the supply of hydrocarbon.

I am aware that it has been proposed to separate phosphorus from its compounds by mixing carbon with phosphoric acid and distilling out the phosphorus; but so far as I am informed such operation has never been successfully performed, nor do I know of suggested means for practically accomplishing this result. On the contrary, so far as I am advised, it has always been found necessary to intermix with the compound some metallic base, such as calcium or lead, for the purpose, among others, of preventing the mere volatilizing of the phosphoric acid. I am also aware that it has been proposed to secure phosphorus from phosphate of lead and from phosphate of ammonia; but I believe these attempts to have been mere laboratory experiments, for the methods suggested will not produce phosphorus in such quantities relatively to the expenditure of energy as to render their employment commercially practical.

None of these proposed methods are, however, analogous to the method forming the subject of this application, in which I not only eliminate substantially all other bodies from the phosphoric acid before resorting to the final smelting operation, which necessitates the employment of an enormously high temperature, but I also perform the comparatively easy smelting operation by which I reduce the phosphoric acid ($P_2O_5$) to phosphorous oxid ($P_2O_3$) in the reverberatory furnace.

By my method I avoid the heating of a mass of material—such as sand, lime, or lead—which can contribute nothing to the object sought, but apply all of the heat energy directly to the eliminating of the oxygen.

It will be seen that by the process herein described the loss of undecomposed phosphoric oxid by evaporation is avoided by using for the preliminary steps a temperature below that required to volatilize it, not bringing the material into the presence of the high temperature necessary to the final separation of the oxygen from the phosphorus until it has been so reduced that it is relatively fixed. Furthermore, the zone of high temperature is so restricted that but a very small quantity of the material is brought into it at one time, while within that zone the temperature is so high that the smelting operation is practically instantaneous.

I claim as my invention—

1. The herein-described process of smelting phosphorus, consisting in first making from a phosphatic base a phosphoric oxid substantially free from lime, roasting the phosphoric oxid in the presence of carbon until the combustible impurities have been consumed and substantially two parts of the oxygen have been smelted out, and then subjecting the phosphorous oxid remaining, intermixed with granular carbon, to the action of an electric arc developed within the mass of the material to be treated and between a negative electrode and the said material in an atmosphere of hydrogen.

2. The herein-described process of smelting phosphorus, consisting in first making from a phosphatic base a phosphoric oxid substantially free from lime, roasting the phosphoric oxid in the presence of carbon until the combustible impurities have been consumed and substantially two parts of the oxygen have been smelted out, and then subjecting the phosphorous oxid remaining, intermixed with granular carbon, to the action of an electric arc developed within the mass of the material to be treated and between a negative electrode and the said material in an atmosphere of hydrogen, and supplying a part of the carbon necessary to the reaction in fluid form through the negative electrode.

3. The herein-described process of smelting phosphorus consisting in subjecting oxid of phosphorus intermixed with granular carbon to the action of an electric arc developed within the mass to be smelted, in an atmosphere of hydrogen and supplying a part of the carbon necessary to the reaction in fluid form through the arc.

4. The herein-described continuous method of smelting phosphorus consisting in treating phosphatic material with sulfuric acid to eliminate substantially all of the lime, roasting the material with carbon to eliminate the major part of the sulfur, then continuously smelting the remaining material in an electric furnace in the presence of hydrogen.

5. The herein-described continuous method of smelting phosphorus consisting in treating phosphatic material with sulfuric acid to eliminate substantially all of the lime, roasting the material with carbon to eliminate the major part of the sulfur, and smelting out a part of the oxygen, then continuously smelting the remaining phosphorous-oxid mixture in an electric furnace in the presence of hydrogen.

6. The herein-described process of smelting phosphorus from a fused bath of phosphatic material by maintaining an electric arc below the surface of the material in an atmosphere of hydrogen and continuously supplying the reducing agent through the fused mass.

7. The herein-described process of smelting phosphorus, consisting in first making from a phosphatic base a phosphoric oxid substantially free from lime, roasting the phosphoric oxid in the presence of carbon until the combustible impurities have been consumed and substantially two parts of the oxygen have been smelted out, then adding to the phosphorous oxid which remains sufficient granular carbon to combine with the residue of the oxygen and subjecting such mixture to the direct heat of an electric arc.

8. The herein-described continuous process of making phosphorus consisting in preparing from a phosphatic base an oxid of phosphorus substantially free from lime and sulfur, mixing the oxid with carbon, maintaining a body of the mixture at a temperature below the point at which the oxid of phosphorus vaporizes and quickly bringing into the field of action of an intense heating means successive portions of the mixture in such quantities that each portion is raised in a substantially inappreciable time to a smelting temperature.

9. The herein-described continuous process of making phosphorus consisting in preparing from a phosphatic base a phosphoric oxid, roasting the oxid in the presence of carbon to eliminate the sulfur and a portion of the oxygen, and then mixing the resultant phosphorous oxid with granular carbon and raising the mixture in a substantially inappreciable period of time to a smelting temperature.

10. The improvement in the art of manufacturing phosphorus which consists in taking a phosphate of a base such as phosphate of lime, treating with an excess of sulfuric acid, eliminating all of said basic material, then roasting the phosphoric acid in an oxidizing atmosphere with carbon to eliminate all the sulfur, and continuously smelting in an electric furnace with carbon the material thus prepared.

11. The improvement in the art of smelting phosphorus which consists in first preparing a material for continuous smelting by taking a phosphate of a base, treating with sulfuric acid, removing all the basic material, roasting with carbon to eliminate all the sulfur, and then continuously smelting said material, thus freed from all deleterious and non-phosphorus-yielding oxids by carbon, in a suitable electric furnace.

12. The method of making phosphorus consisting in taking a mixture of substantially pure oxid of phosphorus and carbon, maintaining the mixture at a temperature below the volatilizing temperature of the oxid, and bringing successive portions of such mixture quickly into the presence of an electric arc in such quantities that each portion is raised in a substantially inappreciable time to a smelting temperature.

In testimony whereof I affix my signature in presence of two witnesses.

CHARLES KNOX HARDING.

Witnesses:
LOUIS K. GILLSON,
HESTER BAIRD.